Nov. 20, 1962
N. P. WORDEN
3,065,342
RESILIENT LAMP MOUNTING
Filed Feb. 12, 1958
2 Sheets-Sheet 1
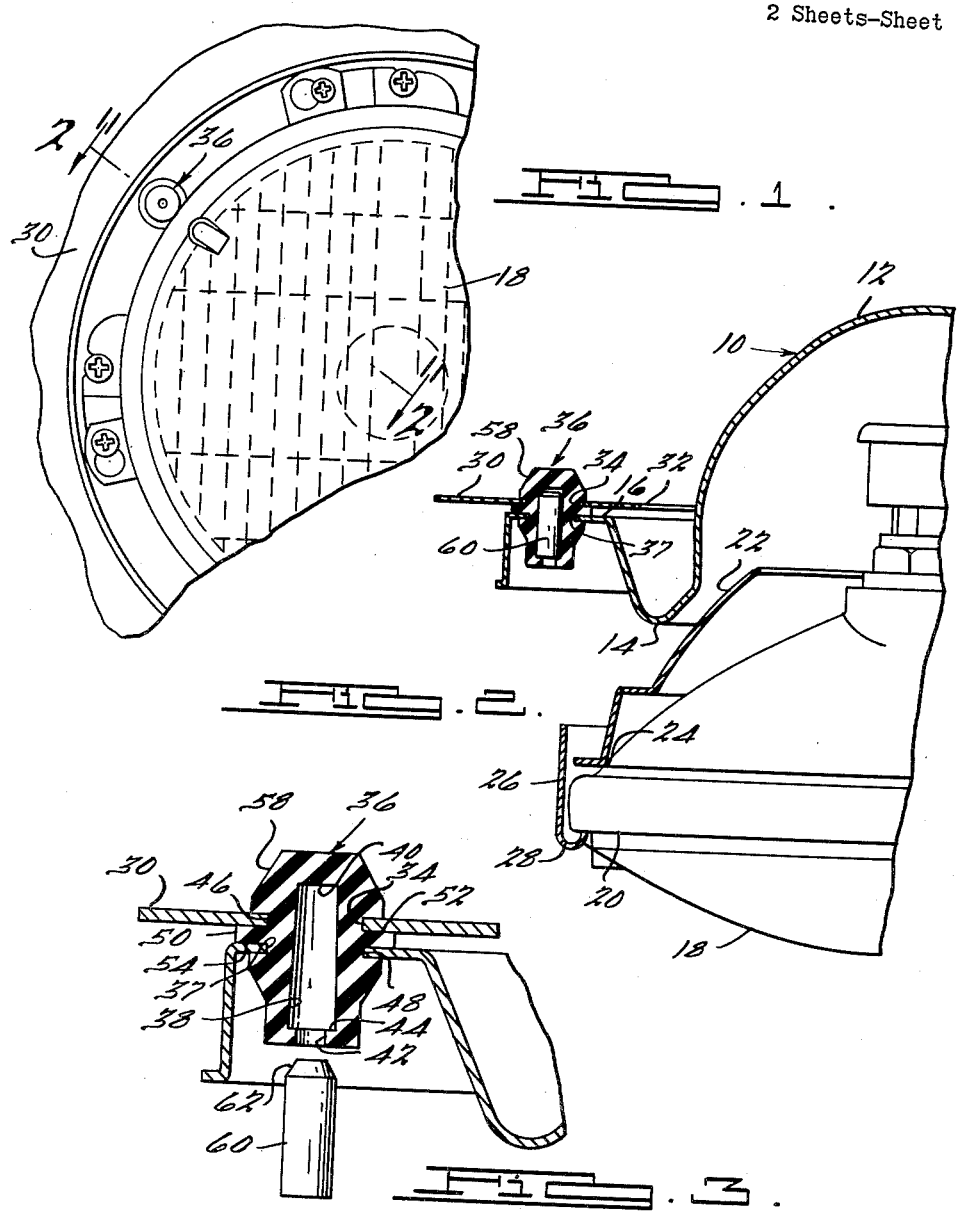
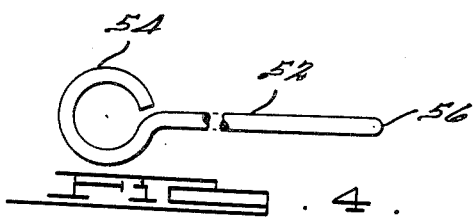
INVENTOR.
Norbert P. Worden
BY
Harness, Dickey & Pierce
ATTORNEYS

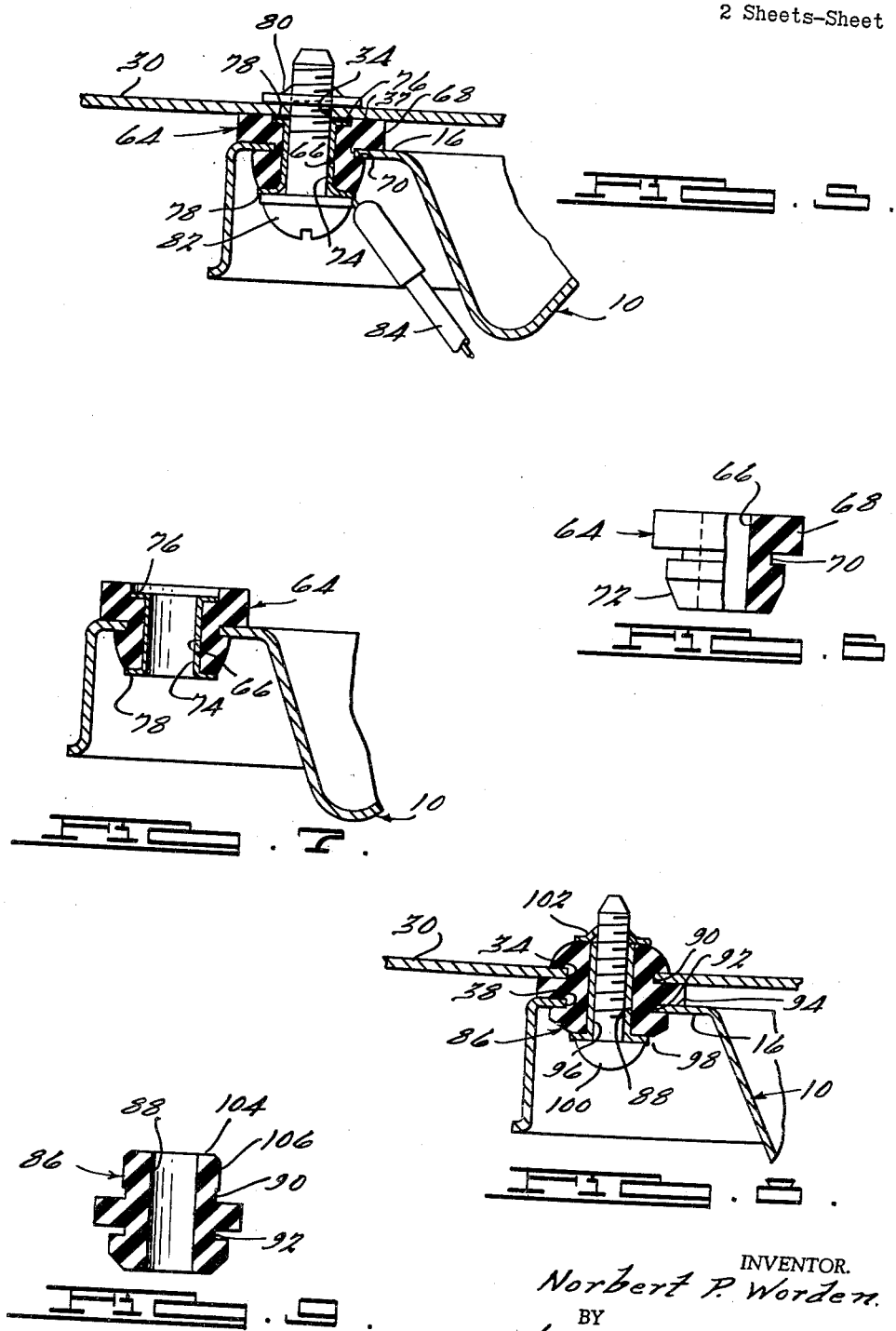

United States Patent Office 3,065,342
Patented Nov. 20, 1962

3,065,342
RESILIENT LAMP MOUNTING
Norbert P. Worden, Detroit, Mich., assignor to C. M. Hall Lamp Company, Detroit, Mich., a corporation of Michigan
Filed Feb. 12, 1958, Ser. No. 714,871
7 Claims. (Cl. 240—90)

This invention relates to lamp mountings and more particularly to resilient head lamp mountings for vehicles.

Vehicle head lamp assemblies have customarily been mounted in the front fenders of the vehicle in rigid, metal-to-metal contact with the fenders. While this type of mounting directly transmitted to the head lamp assembly all of the shocks, jars and vibration of the road which were received by the fenders this condition has not heretofore been an acute problem in the automotive industry. The six-volt automobile electrical system permitted the construction of head lamps having filaments large and strong enough to withstand such vibration for a commercially acceptable period of time. However, the twelve-volt automobile electrical system now in wide use, requires the use of a lighter and more fragile head lamp filament. It has been found that twelve-volt head lamps mounted in the customary rigid manner fail after a relatively short useful life primarily as a result of shock and vibration. The inconvenience and expense of changing head lamps this frequently is manifestly undesirable. Accordingly, it is a primary object of the present invention to provide a vehicle lamp mounting which cushions the lamp from excessive shock and vibration and thereby prolongs the useful life of the lamp.

It is another object of the present invention to provide a vehicle lamp construction utilizing a plurality of resilient mounting members mounted in a vehicle panel which perform a shock absorbing function for the lamp.

It is still another object of the present invention to provide a vehicle lamp mounting of the above character wherein the resilient mounting members may be installed in openings conveniently accessible from only one side, that is to say, in "blind" openings.

It is a still further object of the present invention to provide a vehicle lamp mounting structure of the above character in which the resilient mounting members may be readily secured or locked in position and will not become disengaged from their associated vehicle structure during operation of the vehicle.

A further object of the present invention is to provide a vehicle head lamp mounting structure which is inexpensive to manufacture yet which is sturdy and durable in construction.

Other objects and advantages of the present invention will become apparent from the following detailed description taken in conjunction with the accompanying drawing wherein:

FIGURE 1 is a front elevational view of a vehicle head lamp assembly embodying the principles of the present invention, having a portion of the head lamp broken away.

FIG. 2 is a sectional view taken along the line 2—2 of FIG. 1;

FIG. 3 is an enlarged view of a portion of the structure illustrated in FIG. 1 with the locking plug shown removed from the grommet;

FIG. 4 is an elevational view of a tool used in the assembly of the structure illustrated in FIGS. 1 through 3;

FIG. 5 is a view similar to FIG. 3 illustrating the alternative embodiment of the present invention;

FIG. 6 is a view, partially in section, of the grommet illustrated in FIG. 5;

FIG. 7 is a sectional view similar to FIG. 5, with the vehicle panel, screw and ground wire removed;

FIG. 8 is a sectional view similar to FIG. 3 illustrating another alternative embodiment of the present invention; and FIG. 9 is a sectional view of the grommet illustrated in FIG. 8.

Referring first to FIGS. 1 and 2 of the drawings, the lamp assembly includes a body member 10 having a generally bowl shaped rear portion 12 which has its foremost edge 14 curved outwardly and reversely to provide an annular flange portion 16 spaced circumferentially around the rear bowl shaped portion 12. Mounted within the body member 10 is a sealed beam lamp unit 18 having an annular lip 20 by means of which the unit may be retained in position. Supporting the lamp unit 18 in position within the body member 10 are a generally bowl shaped mounting ring 22 supportingly engaging the lamp unit 18 around its rear face at 24 and an annular bezel 26, also commonly labeled a door by the trade. The bezel 26 is provided with an inwardly turned flange 28 engaging the annular lip 20 of the lamp unit and retaining the lamp unit in engagement with the mounting ring 22. The body member 10, the sealed beam lamp unit 18, the mounting ring 22 and the bezel 26 constitute the lamp assembly and are adapted to be installed in the fender of a vehicle as a unit for common support by the resilient shock absorbing means to be hereafter described.

A panel 30, forming a portion of a vehicle fender, serves as the mounting structure for the above described lamp assembly and is provided with an enlarged aperture 32 within which the rear portion 12 of the body member 10 is positioned in spaced relationship thereto. Circumferentially spaced around the enlarged aperture 32 in the panel 30 are a plurality of small apertures 34 each adapted to receive and support a resilient grommet 36. The grommets 36 are exemplarily illustrated as being fabricated from moulded rubber. However, any suitable resilient shock absorbing material could be used. The flange portion 16 of the body member 10 is likewise provided with a plurality of apertures 37 adapted to align with the apertures 34 for reception of the grommets 36. The entire supporting connection between the body member 10 and the panel 30 is provided by means of the grommets 36, the number of which can be varied to suit the weight, size, etc. of the lamp assembly to be supported. However, it has been found that the use of three grommets 36 is suitable for most head lamp installations.

In the preferred embodiment of the present invention the structure of the grommet 36 is best illustrated in FIG. 3. The grommet 36 is of generally circular cross section and is provided with a central tapered bore, opening, or recess 38 which is blind, that is, it is closed at one end by a rear wall 40. The forward end of the grommet 36 is provided with an aperture 42 of smaller diameter than the forward end of the opening 38 thereby forming a shoulder 44 therebetween. The periphery of the grommet 36 is provided with a rear annular groove 46 adapted to receive the edge of the panel 30 defining the aperture 34 and with a front annular groove 48 adapted to receive the edge of the body member flange 16 defining the aperture 37. Separating the grooves 46 and 48 is an integral annular radially outwardly extending flange 50. When installed, the rear face 52 of the flange 50 abuts the panel 30 while its forward face 54 abuts the flange portion 16 of the body member 10 thereby serving to space said members apart. The diameters of the grooves 46 and 48 are provided to be of the same size as the apertures 34 and 37 respectively, although a minute clearance of, for example, one one-hundredth of an inch, may be provided therebetween. It will thus be appreciated that the grooves 46 and 48 serve to securely hold the grommet 36 in engagement with the body member 10 and the vehicle panel 30 and thereby provide flexible support for the lamp assembly.

Insertion of the grommet 36 into either the aperture 34 or the aperture 37 is accomplished by means of the tool illustrated in FIG. 4, which comprises an elongated rod 52 having a looped handle portion 54. An end 56 of the rod 52 opposite from the handle portion 54 is inserted into the opening 38 so as to bear against the rear end wall 40. The rear end of the grommet 36, which is tapered at 58 to a diameter smaller than the aperture, is aligned with the aperture. Rearward pressure on the rod 52 will then simulate a pulling action and draw the grommet into the aperture. The edge defining the aperture will bear against the taper 58 and have a camming action to compress or deform the grommet inwardly. The grommet being centrally hollowed permits sufficient inward deformation for the periphery of the grommet to clear the edge of the aperture and the grooves 46 and 48 to move into alignment with their aperture defining panel edges. It will be appreciated that the grommet 36 is of such wall thickness and is sufficiently larger than the apertures 34 and 38, that a mere blunt pressure against the front end of the grommet would merely expand the grommet around the front face of the aperture. If it were possible to approach a given aperture from the rear and pull the grommet through with a grasping tool, this would serve the desired purpose, but it frequently happens that the mounting panel 30 is conveniently accessible only from its front side. The present invention overcomes this problem by approaching the grommet from the front side and simulating a pulling action from the rear.

While, for most installations, the grommet 36 is capable of supporting a lamp assembly with its central opening 38 vacant, the present invention permits the use of a locking plug 60 to be positioned within the opening 38 in order to assure positive retention of the grommet 36 in its aperture and eliminate any vibration which might occur through too loose a fit between the grommet 36 and the flange 16. The locking plug 60 is of circular cylindrical configuration and has one end 62 chamfered to facilitate its installation. The diameter of the locking plug 60 is slightly greater than the smaller rear diameter of the tapered opening 38, as for example four-hundredths of an inch greater in a locking plug of nineteen-hundredths of an inch diameter. Insertion of the chamfered end 62 of the locking plug expands the small opening 42 in the grommet and permits the plug to be inserted fully into the recess 38 until the rear end of the plug 60 clears the small opening 42 whereupon the opening 42 is free to contract to normal size and the shoulder 44 thereafter serves to retain the plug 60 within the aperture 38. The plug 60, being slightly greater than the rear end of the opening 38, serves to expand the grommet in tight engagement with the edges of the apertures 34 and 38. Also the locking plug 60 serves to retard any tendency of the grommet 36 to deform inwardly and pull out of its apertures. In actual use the grommet 36 could be installed either with or without a locking plug 60 depending on the weight of the lamp assembly to be supported and the expected stresses to which the grommets might be subjected.

The alternative embodiment of the present invention illustrated in FIG. 5 utilizes a grommet 64 of a somewhat different configuration. The grommet 64 is provided with a central opening or bore 66 which is open at both ends of the grommet. The rear end of the grommet 64 terminates in an enlarged radial flange 68 and an annular peripheral groove 70 is located approximately at its middle. The forward end of the grommet 64 is tapered to a diameter smaller than the diameter of the aperture 37 of the body member flange 16 in order to facilitate installation of the grommet 64 therein. The grommet 64 is assembled with its groove 70 receiving the edges defining the aperture 37 of the body member flange 16. The grommet 64 is inserted in the aperture 37 from its rear thereby camming the tapered end 72 through the aperture 37 and compressing the grommet inwardly until its groove 70 aligns with the wall of the flange portion 16 of the body member 10.

Once the grommet 64 is positioned in the aperture 38 its recess 66 is fitted with a metal eyelet 74 which is thereafter crimped or bent over outwardly at its rear end 76 and at its forward end 78. By crimping the eyelet 74 to the length illustrated in FIG. 7, the grommet 64 is compressed longitudinally so as to tend to increase the engagement of the groove 70 around the aperture 37 and to thereby more securely retain the grommet 64 in the aperture 37. Additionally or alternatively, the outer diameter of the eyelet 66 may be slightly greater than the diameter of the bore 66 (as for example twenty-four-thousandths of one inch greater in a recess which is two-hundred-thousandths of an inch in diameter), so as to force the grommet 64 into tight engagement with its aperture 37.

When the grommet 64 is inserted in the panel 30 its flange 68 abuts the panel 30 annularly around the aperture 34. As will be noted in FIGS. 5 and 7, the crimped-over end 76 of the eyelet 74 is recessed in the grommet 64 to avoid contact of the eyelet 66 with the panel 30. This may be accomplished by crimping the eyelet to that position, as above discussed.

A sheet metal member 80 conformed to act as a nut is welded or otherwise secured to the rear face of the vehicle panel 30 in alignment with the aperture 34 whereby a screw 82 extending through the eyelet 74 and threadably engaging the nut-like member 80 serves to secure the grommet 64 to the panel 30. As will be noted in FIG. 5, this alternative embodiment of the present invention permits a ground wire 84 to be attached to the screw 82 for a convenient ground connection to the body of the vehicle. In the embodiment illustrated in FIGS. 5, 6 and 7 the grommet is rigidly secured to the vehicle panel 30 but the wall supporting contact of the body member 10 of the lamp assembly is in the groove 70 of the resilient grommet 64. Therefore any shocks or vibrations present in the panel 30 will be cushioned by the grommet 64 and either totally absorbed thereby or substantially diminished before being transmitted through the grommet 64 to the lamp assembly.

The embodiment of the present invention illustrated in FIGS. 8 and 9 utilizes a grommet 86 having a central cylindrical bore or opening 88 extending therethrough and provided with a pair of annular peripheral grooves 90 and 92 adapted to receive the aperture 34 of the vehicle panel 30 and the aperture 37 of the body member flange 16, respectively. Separating the grooves 90 and 92 is an enlarged annular radial flange 94 engaging the vehicle panel 30 and body member flange portion 16 and serving to space said members apart. The bore 88 of the grommet 86 is fitted with a metal eyelet 96 having a crimped or bent-over end 98. Eyelet 96 may be somewhat oversize to serve a similar function to the eyelet 74 in expanding and retaining the grommet in its associated aperture. The rear end of the grommet 86 has a nut-like member 102 bonded or otherwise secured thereto in alignment with the recess 88 and adapted to receive a screw 100 extending through the eyelet 96. Tightening of the screw 100 serves to compress the grommet 86, enlarging wall contact of the grooves 90 and 92 around their respective apertures and more positively securing the grommet 86 in position. As in the previously described embodiments of the present invention, total supporting contact for the lamp assembly is provided by the grommets 86 in their grooves 92, thereby insuring resiliency at all supporting points.

Both front and rear ends of the grommet 86 are tapered to further facilitate installation of the grommet in the apertures. As will be noted in FIG. 9, the normal diameter of the grommet 86 between its rear end 104 and the groove 90, indicated at 106, is only slightly greater than the diameter of the aperture 34, thereby necessitating only slight inward deformation of the grommet in order to accomplish its installation in the aperture 34. However, when the screw 100 is tightened against the nut-like member 102 this diameter will expand sufficiently to insure against retraction of the grommet 86 out of the aperture 34. It will be appreciated that in this embodiment of the present invention as in the previous embodiments the grommet may be inserted in the aperture 34 of the panel 30 from the forward face of the panel 30 without the necessity of applying any tools or performing any other operations from the rear face of the panel 30. Thus the construction of the present invention may be utilized in vehicle panels which are accessible from one face only and which do not permit any manual or other access to the rear face.

While it will be apparent that the preferred embodiments herein demonstrated are well calculated to fulfill the objects above stated, it will be appreciated that the invention is susceptible to modification, variation and change without departing from the proper scope and fair meaning of the subjoined claims.

What is claimed is:

1. In a vehicle having a lamp and an apertured mounting panel in which movement of the vehicle tends to produce destructive vibration of the lamp, the combination of a body member for supporting the lamp, said body member having a plurality of apertures therein, and means for limiting the transfer of vibration from the mounting panel to said lamp and for resiliently mounting said body member on the mounting panel comprising a plurality of unitary elastomeric grommets, each of said grommets having a central opening therein, a groove formed in the periphery thereof around said opening adapted to supportingly receive the edge defining an aperture of said body member and a peripheral flange disposed adjacent said groove engageable with the mounting panel, and rigid means disposed within the opening of each of said grommets operable to produce radial expansion of portions of the grommets into intimate engagement with said body member at the adjacent ones of said apertures.

2. The combination set forth in claim 1 in which each of said rigid means is of larger diameter than the normal diameter of the associated grommet opening and are assembled into said openings after said grommets have been assembled to said body member.

3. In a vehicle having a lamp and an apertured mounting panel wherein movement of the vehicle tends to produce destructive vibration of the lamp, the combination of a body member for supporting the lamp, said body member having a plurality of apertures therein and means for resiliently mounting said body member on the mounting panel including a plurality of resilient grommets, each of said grommets having an opening therethrough, a groove formed on the periphery thereof around said opening adapted to supportingly receive the edge defining an aperture of said body member and a peripheral flange adjacent said groove engageable with the mounting panel, an eyelet of greater diameter than said opening disposed in said opening and a screw member extending through said eyelet, means associated with said mounting panel threadably engaging said screw member for holding said grommet against said mounting panel.

4. In a vehicle having a lamp and an apertured mounting panel wherein movement of the vehicle tends to produce destructive vibration of the lamp, the combination of a body member for supporting the lamp, said body member having a plurality of apertures therein and means for resiliently mounting said body member on the mounting panel including a plurality of resilient grommets, each of said grommets having an opening therethrough, a pair of spaced grooves formed on the periphery thereof, and a flange portion disposed intermediate said grooves, one of said grooves being adapted to supportingly engage the edge of said body member defining an aperture therein, the other of said grooves being adapted to supportingly engage the edge of said mounting panel defining an aperture thereof, and rigid means disposed within the opening of each of said grommets operable to radially expand said grommets into intimate engagement with said mounting panels and said body member adjacent the apertures thereof.

5. In a vehicle having a lamp and an apertured mounting panel wherein movement of the vehicle tends to produce destructive vibration of the lamp, the combination of a body member for supporting the lamp, said body member having a plurality of apertures therein and means for resiliently mounting said body member on the mounting panel including a plurality of resilient grommets, each of said grommets having an opening therethrough, a pair of spaced grooves formed on the periphery thereof, and a flange portion disposed intermediate said grooves, one of said grooves being adapted to supportingly engage the edge of said body member defining an aperture therein, the other of said grooves being adapted to supportingly engage the edge of said mounting panel defining an aperture thereof, a separate nut member held in abutment with each of said grommets on the side of said mounting panel opposite from said body member, and an elongated threaded fastener disposed in each of said grommet openings threadably engageable with said nut members and operable upon tightening to expand said grommets radially outwardly into intimate gripping engagement with said body member and said mounting panel adjacent the apertures thereof.

6. In a vehicle having a lamp and an apertured mounting panel wherein movement of the vehicle tends to produce destructive vibration of the lamp, the combination of a body member for supporting the lamp, said body member having a plurality of apertures therein and means for resiliently mounting said body member on the mounting panel including a plurality of resilient grommets, each of said grommets having a blind opening therein, an end wall forming the end of said opening, a pair of spaced grooves on the periphery thereof, and a flange portion disposed intermediate said grooves, one of said grooves being adapted to supportingly receive the edge defining an aperture of the mounting panel and the other of said grooves being adapted to supportingly receive the edge defining an aperture of said body member, and a rigid member of greater diameter than the normal diameter of said opening disposed within the opening of each of said grommets for radially expanding said grommets into intimate engagement with said mounting panel and body member adjacent the apertures thereof.

7. The structure set forth in claim 6 in which the end wall of each of said apertures is disposed on the side of said mounting panel opposite from said body member and in which each of said grommets has a tapered outer wall portion which at its one end is of a diameter smaller than the diameter of the aperture in which the grommet is fitted.

References Cited in the file of this patent

UNITED STATES PATENTS

| | | |
|---|---|---|
| 1,540,435 | Tebo | June 2, 1925 |
| 2,208,532 | Woodward | July 16, 1940 |
| 2,455,891 | Flanagan | Dec. 7, 1948 |
| 2,639,496 | Hartzell | May 26, 1953 |
| 2,724,770 | Onksen | Nov. 22, 1955 |
| 2,741,324 | Anderson | Apr. 10, 1956 |
| 2,759,390 | Edwards | Aug. 21, 1956 |
| 2,782,298 | Scholz et al. | Feb. 19, 1957 |
| 2,800,578 | Falge | July 23, 1957 |
| 2,849,201 | Schelgunov | Aug. 26, 1958 |

FOREIGN PATENTS

| | | |
|---|---|---|
| 595,623 | France | July 20, 1925 |